(12) United States Patent
van Hoof

(10) Patent No.: US 6,937,607 B2
(45) Date of Patent: Aug. 30, 2005

(54) RANDOM EARLY DISCARD FOR CELL-SWITCHED DATA SWITCH

(75) Inventor: Werner van Hoof, Kanata (CA)

(73) Assignee: Alcatel, Paris (FR)

(*) Notice: Subject to any disclaimer, the term of this patent is extended or adjusted under 35 U.S.C. 154(b) by 546 days.

(21) Appl. No.: 10/050,439

(22) Filed: Jan. 16, 2002

(65) Prior Publication Data

US 2003/0002534 A1 Jan. 2, 2003

Related U.S. Application Data

(60) Provisional application No. 60/299,961, filed on Jun. 21, 2001.

(51) Int. Cl.[7] .............................. H04L 12/56; H04J 3/24
(52) U.S. Cl. ....................... 370/414; 370/416; 370/418; 370/474
(58) Field of Search ................................ 370/412–418, 370/474, 389, 395.1, 230.1, 235–236

(56) References Cited

U.S. PATENT DOCUMENTS

| | | | |
|---|---|---|---|
| 4,953,157 A | | 8/1990 | Franklin et al. |
| 5,390,176 A | | 2/1995 | Schoute et al. |
| 5,521,923 A | | 5/1996 | Willmann et al. |
| 5,546,389 A | | 8/1996 | Wippenbeck et al. |
| 5,768,257 A | | 6/1998 | Khacherian et al. |
| 6,032,190 A | * | 2/2000 | Bremer et al. .............. 709/238 |
| 6,049,527 A | | 4/2000 | Isoyama et al. |
| 6,442,172 B1 | * | 8/2002 | Wallner et al. ............. 370/416 |
| 6,526,060 B1 | * | 2/2003 | Hughes et al. ............ 370/395.4 |
| 6,542,502 B1 | * | 4/2003 | Herring et al. ............. 370/390 |
| 6,721,273 B1 | * | 4/2004 | Lyon .......................... 370/235 |
| 6,735,173 B1 | * | 5/2004 | Lenoski et al. ............. 370/235 |

FOREIGN PATENT DOCUMENTS

| | | |
|---|---|---|
| CA | 2238798 | 11/1999 |
| WO | WO 01/39430 A2 | 5/2001 |

OTHER PUBLICATIONS

*IP to ATM Class of Service Phase 1 Design Guide*; 51 pp.
*Junos™ Internet Software Configuration Guide Interfaces and Class of Service Release 5.2*; Juniper Networks, Inc.; 474 pp.
Floyd, Sally et al.; *Random Early Detection Gateways for Congestion Avoidance*; IEEE/ACM Transactions on Networking; vol. 1, No. 4; Aug. 1993; pp. 397–413.
Lin, Arthur Y.M. et al.; *Priority Queuing Strategies and Buffer Allocation Protocols for Traffic Control at an ATM Integrated Broadband Switching System*; IEEE Journal on Selected Areas in Communications; vol. 9, No. 9; Dec. 1991; pp. 1524–1536.
International Search Report for corresponding Eurpoean patent application No. 02013747.7 dated Sep. 9, 2002.
Cheon et al., "Early Selective Packet Discard for Alternating Resource Access of TCP over ATM–UBR", *IEEE*, 1997, pp. 306–316.

* cited by examiner

Primary Examiner—Chi Pham
Assistant Examiner—Ronald Abelson
(74) Attorney, Agent, or Firm—Craig A. Boersten; V. Lawrence Sewell

(57) ABSTRACT

A congestion control method and apparatus in a cell-switched data switch. The switch attaches a tag with a discard processing indicator, such as a particular random number, to all cells belonging to a same packet. In determining which cells to drop when running a congestion control algorithm such as RED, the switch compares the discard processing indicator of the cells with a discard criterion and only drops cells that conform with the discard criterion.

26 Claims, 5 Drawing Sheets

RANDOM EARLY DISCARD FOR CELL-SWITCHED DATA SWITCH

CROSS-REFERENCE TO RELATED APPLICATION(S)

This application claims the benefit of U.S. Provisional Application No. 60/299,961, filed Jun. 21, 2001, the content of which is incorporated herein by reference.

FIELD OF THE INVENTION

The present invention relates generally to congestion avoidance mechanisms, and more particularly, to a congestion avoidance mechanism in a cell-switched data switch.

BACKGROUND OF THE INVENTION

Data switch architectures include packet-switched and cell-switched varieties. Packet-switched data switches switch variable-length packets as a whole from ingress ports to egress ports. Cell-switched data switches segment packets into fixed-length units called cells, and separately switch the units from ingress ports to egress ports.

One feature becoming more prevalent in data switches is a congestion avoidance mechanism referred to as random early discard (RED), described in further detail in S. Floyd et. al, "Random Early Detection Gateways for Congestion Avoidance," *IEE/ACM Transactions on Networking*, Vol. 1, No. 4, 397–413 (August 1993), the content of which is incorporated herein by reference. While RED and other similar congestion avoidance mechanisms are relatively easy to implement in packet-switched data switches, it is more difficult in cell-switched data switches. Due to the segmentation of a packet into multiple cells upon ingress in a cell-switched data switch, it is difficult to ensure proper retention/discard processing of the packet. Particularly, if a different retention/discard decision is made for different cells of the packet, fewer than all cells of the packet will generally be retained, a condition generally known as partial packet discard (PPD), and the packet will generally not be successfully reassembled. This non-uniform retention/discard processing may arise from, for instance, making the retention/discard decision for the different constituent cells of a packet at different places within a distributed switching architecture, or at different times.

Accordingly, there is a need for efficient RED for a cell-switched data switch, and more generally, a need to avoid PPD in a cell-switched data switch by ensuring uniform retention/discard processing of the constituent cells of a packet.

SUMMARY OF THE INVENTION

The present invention is directed to a congestion control method and apparatus for a cell-switched data switch that provides a uniform discard and retention decision for cells belonging to a same data packet. In one embodiment, the present invention comprises a data switch including an input port, an output port and a memory coupled therebetween. The data switch generates a discard processing indicator for a packet received on the input port, segments said packet into ones of units, and appends the discard processing indicator to the ones of units. The data switch compares the discard processing indicator appended to the ones of units with a discard criterion to determine whether to discard the ones of units.

In another embodiment, the present invention comprises a data switch including an input port, an output port, and a switch fabric operative between the input port and the output port. The input port generates a tag including a discard processing indicator for appending to ones of input units segmented from an input data packet. The output port includes one or more output queues where each output queue stores an output unit. The switch fabric includes a congestion controller that retrieves a level of utilization of an output queue to which a particular unit is destined and selects the input unit for discard or not based on the discard processing indicator in the tag appended to the input unit.

In a further embodiment, the present invention is directed to a method for congestion control in a data switch including an input port, an output port, and a memory coupled therebetween. The method includes generating a number for a packet received on the input port, segmenting the packet into ones of units, appending the number to the ones of units, and individually comparing the number appended to the ones of units with a discard criterion for determining whether to discard the packet.

In another embodiment, the method for congestion control includes generating a tag including a discard processing indicator, appending the tag with the discard processing indicator to each unit segmented from an input data packet, determining a level of utilization of an output queue to which a particular unit of the input data packet is destined, determining a discard criterion in accordance with the determined level of utilization, and discarding the particular unit based on a conformance of the discard processing indicator in the tag appended to the particular unit with the discard criterion.

In a further embodiment, the invention is directed to a data switch comprising an input port, an output port and a memory coupled therebetween where the data switch generates a uniform discard processing indicator for a packet received on the input port, segments the packet into ones of units, and appends the uniform discard processing indicator to the ones of units. The data switch compares for each of the ones of the units the uniform discard processing indicator appended thereto with a uniform discard criterion for ensuring that the ones of units receive a uniform discard decision.

It should be appreciated, therefore, that the present invention provides a method and apparatus which helps avoid PPD in a cell-switched data switch. The comparing of a discard processing indicator attached to each cell to a discard criterion helps ensure that if a unit belonging to a particular packet is identified to be dropped, all other units belonging to the packet are also dropped.

BRIEF DESCRIPTION OF THE DRAWINGS

These and other features, aspects and advantages of the present invention will be more fully understood when considered with respect to the following detailed description, appended claims, and accompanying drawings where:

DETAILED DESCRIPTION

Figure 1:
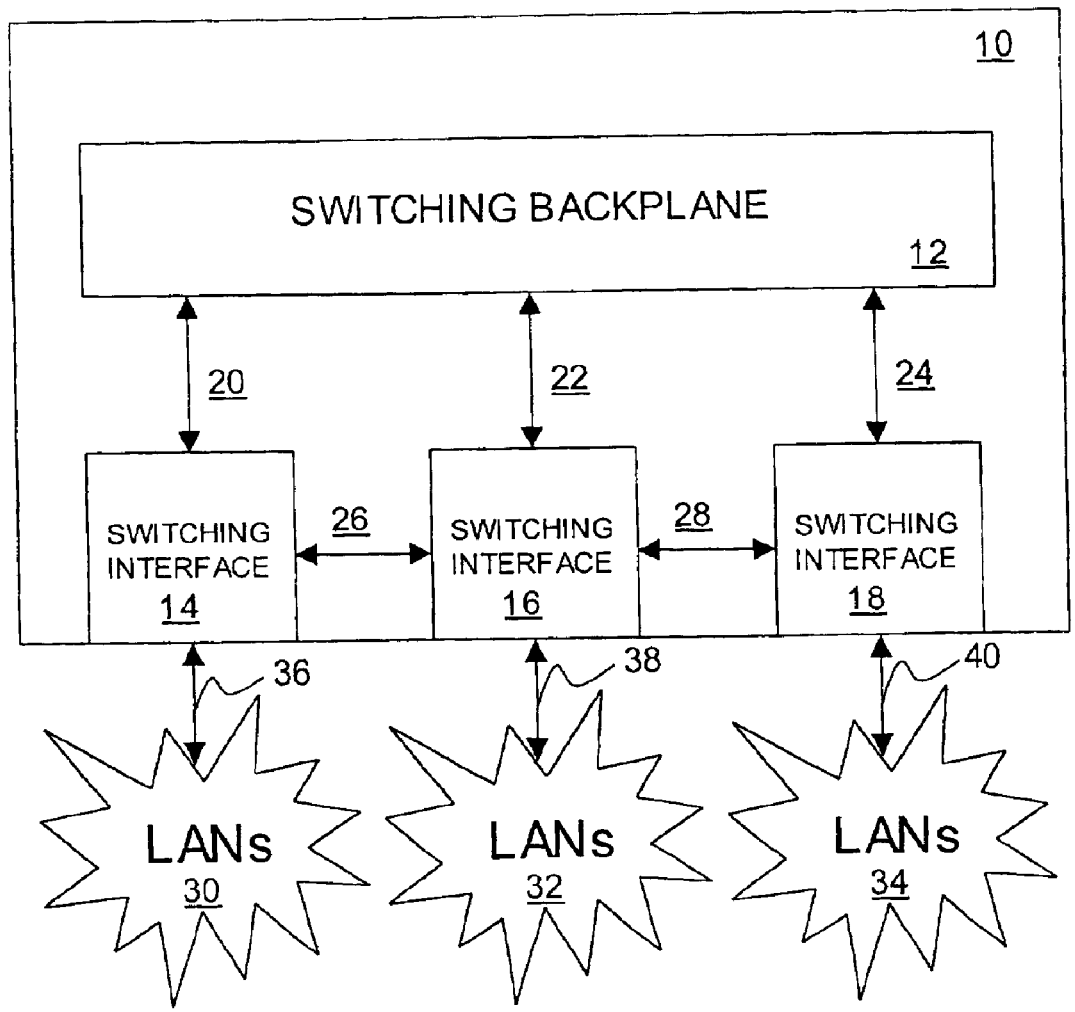
FIG. 1 is a schematic block diagram of a cell-switched data switch according to one embodiment of the invention.

FIG. 1 is a schematic block diagram of a cell-switched data switch 10 according to one embodiment of the invention. The cell-switched data switch 10 may also be referred to as simply a switch, a data communication node, or a data communication switch. The data switch 10 includes switching interfaces 14, 16 and 18 interconnected to respective groups of local area networks (LANs) 30, 32, 34, and interconnected to one another over data paths 20, 22, 24 via a switching backplane 12. The switching backplane 12 preferably includes a switching fabric connecting the switching interfaces to one another in a manner that is conventional in the art. The switching interfaces may also be coupled to one another over control paths 26 and 28.

The switching interfaces 14, 16, 18 are preferably ingress/egress ports receiving/transmitting packets from/to the LANs over cable media 36, 38, 40, such as, for example, optical fiber. The switching interfaces preferably forward packets to and from their respective groups of LANs 30, 32, 34 in accordance with one or more operative communication protocols, such as, for example, an Internet Protocol (IP). The switching node 10 is shown for illustrative purposes only. In practice, packet switching nodes may include more or less than three switching interfaces. The switching interfaces may also forward packets to and from other switching nodes.

Figure 2:
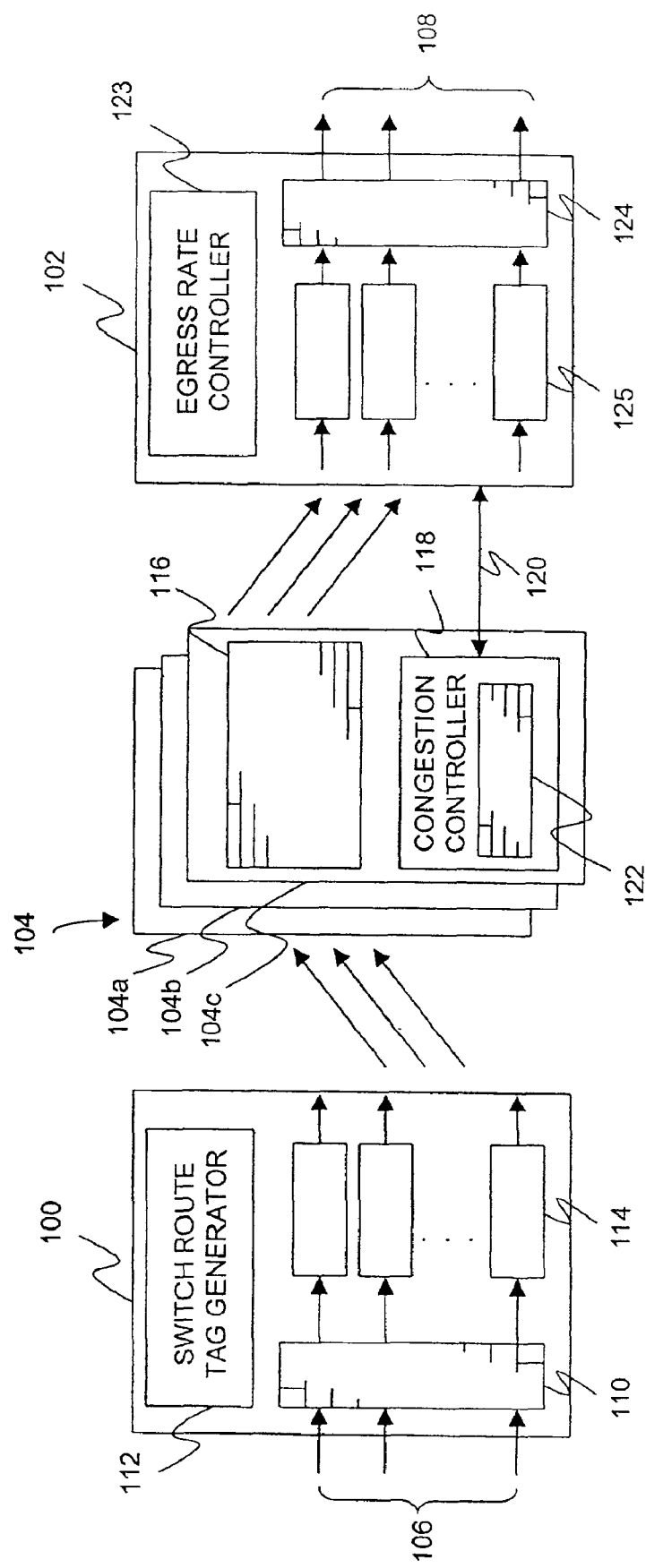
FIG. 2 is more detailed block diagram of the cell-switched data switch of FIG. 1 according to one embodiment of the invention.

FIG. 2 is more detailed block diagram of a cell-switched data switch according to one embodiment of the invention. The cell-switched data switch preferably includes one or more ingress input/output (I/O) controls 100 and one or more egress I/O controls 102 connected by a switch fabric 104. The ingress and egress I/O controls 100, 102 are each respectively coupled to a plurality of ingress and egress ports 106, 108, which may be similar to the switching interfaces 14, 16, 18 of FIG. 1.

Each ingress I/O control 100 preferably includes an ingress memory 110, I/O ports 114, and a switch route tag (SRT) generator 112. According to one embodiment of the invention, the ingress memory 110 is a unitary buffer that stores data packets in a single queue. According to another embodiment of the invention, the ingress memory includes a separate queue for each input port which stores a data packet in the queue associated with the receiving input port.

The data packets in the ingress memory 110 are segmented into fixed length data units, also referred to as cells. Each cell is transmitted to the switch fabric 104 via the I/O ports 114.

The SRT generator 112 preferably includes logic and/or circuitry for generating a tag that is appended to each cell as header information. The SRT generator 112 may be implemented in software, hardware, and/or firmware (e.g. an application specific integrated circuit (ASIC)). The tag generated by the SRT generator may include a random number, a time stamp, and/or any other information used for determining whether the data unit is to be dropped or forwarded to the egress ports. Preferably, the same tag is applied to each data unit that belongs to the same packet.

The switch fabric 104 may reside in a switching backplane similar to the switching backplane 12 of FIG. 1. The switch fabric preferably includes multiple switching elements 104a–c for switching the cells to their destination output ports 108. Each switching element preferably includes a fabric memory 116 for storing the cells to be switched to the egress ports 108. Each switching element further includes a congestion controller 118 running a congestion control algorithm, such as, for example, a random early discard (RED) algorithm, for determining if a cell is to be forwarded to the egress I/O control 102 or discarded, based on current cell traffic information. A person skilled in the art should recognize, however, that other derivatives of the RED algorithm may be employed as the congestion avoidance mechanism, such as, for example, a weighted RED (WRED) mechanism.

The congestion controller 118 preferably includes a queue utilization table 122 containing information on levels of utilization of preferably all the output queues associated with the output ports 108 monitored by the congestion controller 118. The queue utilization table preferably contains multiple entries for a particular output queue depicting a filling level of the output queue at different points in time. The entries of the queue utilization table 122 are preferably updated based on congestion updates received from the one or more egress I/O controls 102 over a communication bus 120 preferably shared by the one or more egress I/O controls.

Each egress I/O control 102 preferably includes an egress rate controller 123, reassembly queues 125, and an egress memory 124. Each reassembly queue 125 stores the cells to be reassembled into data packets and to be transmitted via a particular output port 108. The reassembled data packets are preferably stored in the egress memory 124 until their scheduled transmission time. Preferably, the egress memory 124 is a buffer including a separate output queue for each of the separate output ports 108, each output queue storing retained data packets destined for its output port. In another embodiment of the invention, the egress memory 124 includes a unitary buffer storing all the retained data packets in a single queue. In a further embodiment of the invention, the egress memory 124 may be a buffer including various priority output queues for each of the separate output ports 108, where a data packet destined for a particular output port is stored in a particular output queue associated with the output port based on its priority.

The egress rate controller 123 is preferably a scheduler for dequeuing data packets from the output queues in the egress memory 124. The scheduler preferably dequeues the data packets according to a particular dequeuing algorithm such as, for example, a weighted round robin algorithm, class based dequeuing, or the like.

In general terms, the ingress I/O control 100 preferably receives from the input ports 106 various inbound data packets. The data packets are segmented by the ingress I/O control 100 into discrete units, such as fixed-size cells, in a manner well known to those skilled in the art. The segmented units are transmitted via the I/O ports 114 to one of the switching elements 104a–c in the switching fabric 104. Upon arrival in the switch fabric, the data units are stored in the corresponding switching element and/or discarded based upon a match with a discard criterion associated with a destination output queue.

Each output queue in the egress memory 124 preferably periodically broadcasts to all the switching elements in the switch fabric a congestion status, also referred to as a filling level or utilization level of the output queue. The information is used to update entries in the queue utilization table 122 of the switching element. The information in the queue utilization table is then used by the congestion controller 118 for determining if the units are to be discarded or retained.

If the units are to be discarded, the congestion controller 118 preferably ensures that the units that are discarded belong to the same packet. In this regard, the congestion controller examines the tags generated and appended by the SRT generator 112 to the units, and selects those units whose tags or portions thereof conform to a pre-determined discard criterion. The pre-determined discard criterion may be, for instance, a subset of random numbers, a numerical threshold, an ingress queue address, QOS information, and/or the like. A person skilled in the art should appreciate, therefore, that this allows for uniform discard and retention decisions for cells belonging to the same data packet for eliminating PPD conditions.

A data unit that is retained is stored in the fabric memory 116 for transmitting to the I/O egress control 102 of a destination output port. In an alternative embodiment, a data unit is first stored in the fabric memory and then discarded based on congestion control information.

Once received by the I/O egress control 102, the data units are stored in the reassembly queues 125 for reassembly into data packets. The reassembled data packets are stored in an appropriate output queue of the egress memory 124 and forwarded via a destination output port 108.

Figure 3:
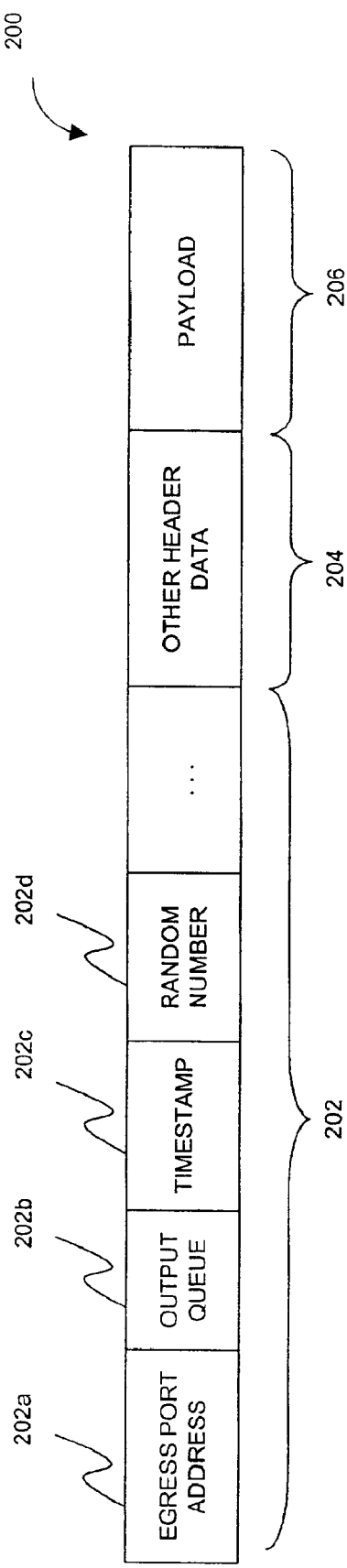
FIG. 3 is a diagram of a format of an exemplary data unit after processing by an ingress I/O control according to one embodiment of the invention.

FIG. 3 is a diagram of a format of an exemplary data unit 200 after processing by the ingress I/O control 100 according to one embodiment of the invention. The data unit 200 preferably includes an SRT 202 header, other header data 204, and a payload 206. The SRT 202 preferably includes an egress port address 202a, local output queue number 202b and a time stamp 202c. The egress port address 202a along with the local output queue number 202b identifies a particular output queue in the system for which a queue utilization level is to be examined. The timestamp 202c preferably identifies a time or global clock count in which a data packet was received by the ingress I/O control 100.

The queue utilization table 120 preferably maintains for the identified output queue, multiple queue utilization levels for different time periods. The time stamp 202c information in the SRT 202 is preferably used to identify a queue utilization level at the time period indicated by the time stamp. This preferably allows cells transmitted by the ingress I/O control 100 at different times, but belonging to one and the same packet, to retrieve the same utilization level information.

The SRT 202 further includes one or more fields containing one or more discard processing indicators used by the congestion controller 118 to compare against a discard criterion in determining whether to drop or retain a cell in the switch fabric 104 if the queue utilization level indicates a possibility of a congestion. Discard processing indicators may include, for instance, a random number 202d, an ingress port address, a priority number, and/or any other information tested for conformance with the discard criterion. Preferably, the same discard processing indicator is appended to all data units belonging to the same data packet.

Other header data 204 of the data unit may include, but is not limited to generic flow control data, payload type, priority information, and header error check information. The payload 204 is preferably of a fixed size, and contains data to be forwarded via an output port.

Figure 4:
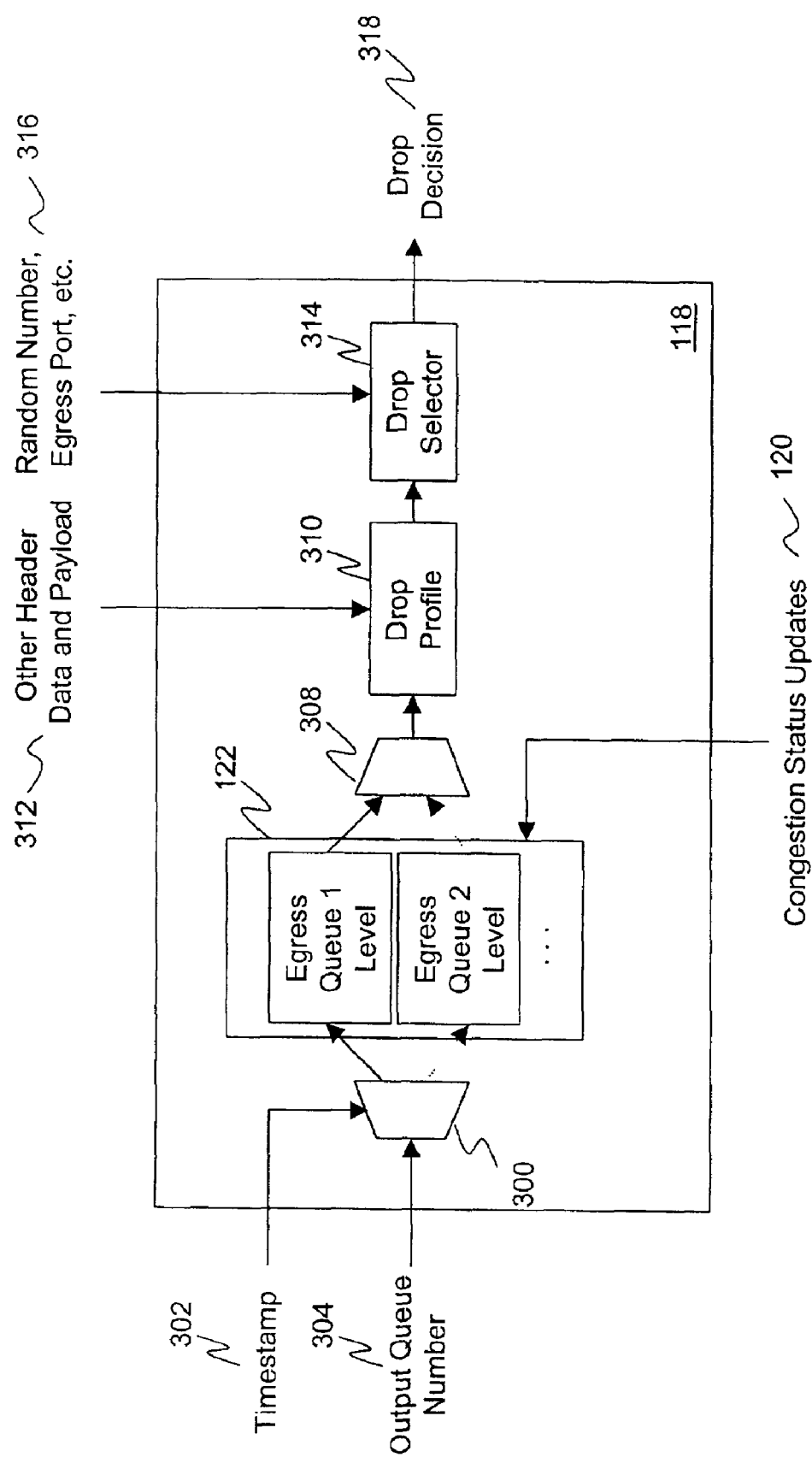
FIG. 4 is a more detailed block diagram of a congestion controller according to one embodiment of the invention.

FIG. 4 is a more detailed block diagram of the congestion controller 118 of FIG. 1 according to one embodiment of the invention. The congestion controller 118 preferably includes a demultiplexer function 300 used to select an appropriate egress queue level entry in a queue utilization table 122 for a particular output port based on a data unit's timestamp 302 and output queue number 304. The timestamp 302 and output queue number 304 are obtained from the timestamp 202b and output queue number 202a fields of the data unit's SRT. After an appropriate address to the queue utilization table 122 is obtained using the timestamp 302 and output queue number 304, the queue level information stored in the address is retrieved for forwarding to a drop profile module 310. A multiplexer function 308 coupled to a drop profile module 310 receives the identified queue level information from the queue utilization table 122 and forwards the information to the drop profile module 310.

The drop profile module 310 preferably invokes a congestion control algorithm such as, for example, RED, to determine a percentage of data units destined for the identified output queue that are to be dropped. The dropping percentage is preferably calculated based on the queue level information, and other header data and payload information, such as, for example, QoS level, DSCP colors, and the like. For example, if the filling level of an egress queue associated with a particular cell is seventy-five percent, and the congestion controller 118 indicates that at this filling level, fifty percent of the incoming cells destined for the egress queue are to be dropped, the dropping percentage for the queue is set to fifty percent.

The dropping percentage is transmitted to a drop selector module 314 which selects as many data units destined for the output queue to be discarded as indicated by the dropping percentage. Preferably, the drop selector module 314 selects a discard criterion 316 used for determining the data units that are to be dropped. Preferably, the discard criterion 316 is a subset of random numbers aimed to fulfill the dropping percentage. A person skilled in the art should recognize, however, that other criteria based on SRT information may also be used instead of the random numbers.

According to one embodiment of the invention, the discard criterion is regulated dynamically in accordance with the dropping percentage. For example, if fifty percent of incoming data units are to be dropped, the discard criterion may be dynamically selected to be even numbers for discarding cells with only even numbers in the random number field 202c of the SRT 202. Because any two data cells that belong to the same packet should have the same random number assigned, all cells of a data packet are dropped if their assigned random number is an even number. Dropping data units based on the discard processing indicia contained in a data unit's SRT allows the uniform discard processing of cells that belong to the same packet to help avoid PPD scenarios.

The queue utilization table 122 is periodically updated with congestion status updates 320 received from the egress I/O control. According to one embodiment of the invention, a time multiplexed driven method is utilized for transmitting the congestion updates. Preferably, the queue utilization tables 122 and the output ports 108 are synchronized on a global clock, and each output queue associated with an output port is assigned a timeslot to broadcast its filling level. Broadcasts may be done using a register chain or using a tri-state scheme in a manner that is conventional in the art.

Figure 5:
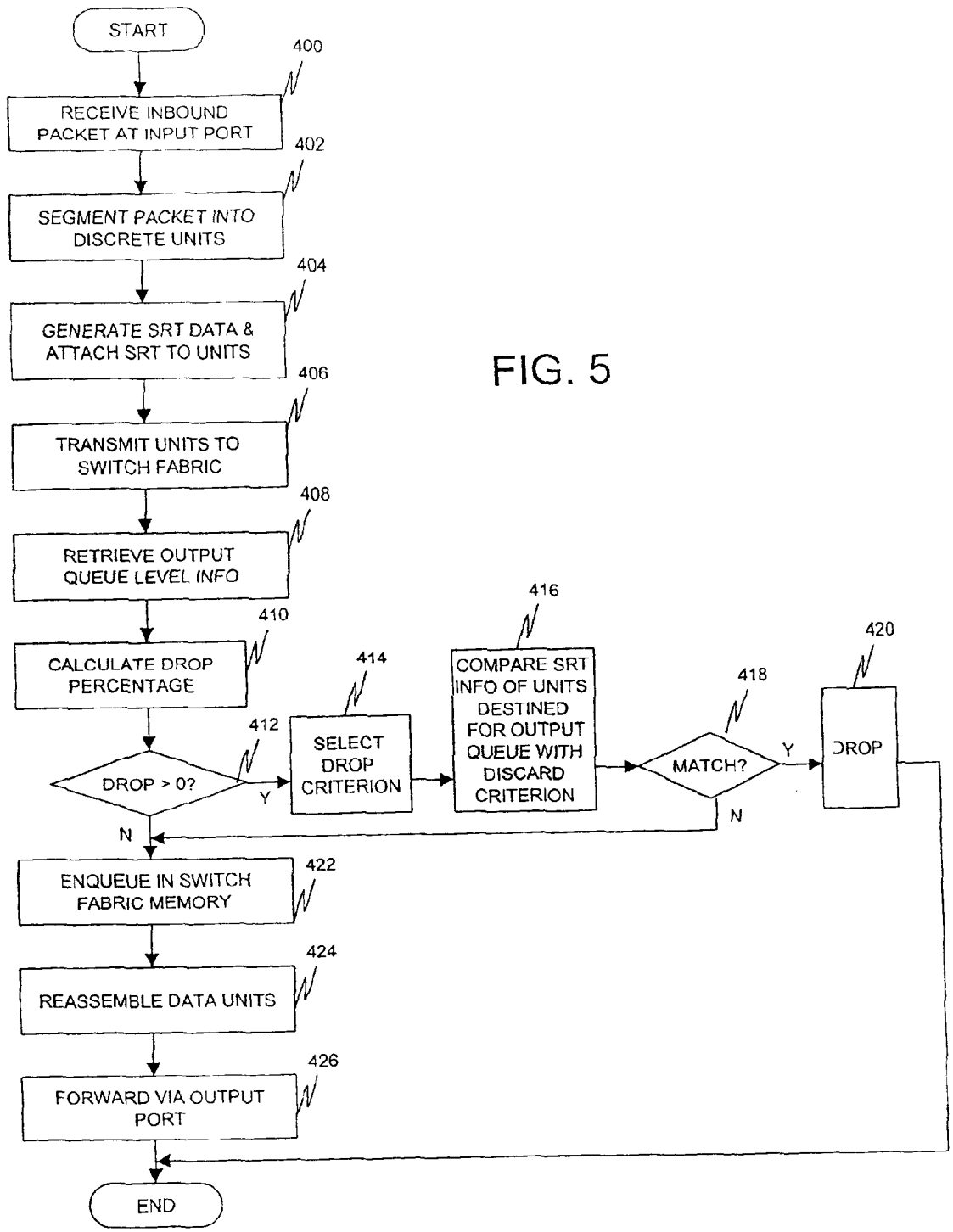
FIG. 5 is a flow diagram illustrating a processing of an inbound data packet according to one embodiment of the invention.

FIG. 5 is a flow diagram illustrating a processing of an inbound data packet according to one embodiment of the invention. The process starts, and in step 400, the ingress I/O control 100 at an input port receives the inbound data packet. In step 402, the ingress I/O control 100 segments the data packet into discrete units. In step 404, the SRT generator generates an SRT for each of the units, and attaches the SRT to each unit. Preferably, the same discard processing indicator, timestamp, egress port, and queue information is included in the SRTs for units that belong to the same packet.

In step 406, the ingress I/O control 100 transmits each unit with the appended SRT to the switch fabric 104. In step 408, the congestion controller 118 determines the congestion level of the output queue to which a particular unit is destined by retrieving and examining the queue's utilization level. The address into the queue utilization level table for a data unit destined for ouput queue Qo with a timestamp T1 is calculated according to the following algorithm:

Address_Data_Unit($Qo, T1$) =

$$\text{Address\_write\_in}(T1) - (\text{QueueNumber\_write\_in}(T1) - Qo)$$

where:
Address_Data_Unit(Qo, T1)=The address into the queue utilization level table for a data unit destined for output queue Qo with a timestamp T1.
Address_write_in(T1)=Filling level write-in Address in Queue Utilization Table at T1=(T1) modulus (Queue Utilization Table Address Depth).
QueueNumber_write_in(T1)=Queue Number for which the Filling Level is updated at T1=(T1) modulus (Total Number of Queues).
The timestamp T1 is the Global Clock Count at packet reception. The timestamp is added to each data unit belonging to the packet.

The Queue Utilization Table Address Depth is preferably at least Total number of Queues+N*Total Number of Queues where N is such that N*Tfilling>Tpacket+Tjitter. Furthermore, Tfilling is the time to fill one full queue utilization status section, Tpacket is the time to send all the data units for a maximum length packet, and Tjitter is the maximum send and receive jitter in the system.

In step 410, the congestion controller 118 determines a drop percentage for the output queue based on any of the well-known congestion control algorithms. The drop percentage may be calculated, for instance, based on one or more discard thresholds set for the queue.

In step 412, the congestion controller 118 determines whether the drop percentage is greater than zero. If the answer is YES, the congestion controller, in step 414, dynamically selects a discard criterion as a function of the drop percentage. In step 416, the congestion controller compares the discard processing indicator in the SRT of units destined for the same output queue, with the discard criterion. If a match is found, as determined in step 418, the identified units are dropped in step 420. The comparing of SRT information to the discard criterion helps ensure that if a unit belonging to a particular packet is identified to be dropped, all units belonging to the packet are also dropped.

If a match is not found between the discard criterion and the SRT information of a cell being compared, the cell is not dropped but enqueued in the switch fabric memory 116 in step 422. In step 424, the retained cells are reassembled into packets for forwarding by the egress rate controller in step 426 via an output port.

Similarly, referring again to step 412, if the drop percentage is not greater than zero, the cell being examined is enqueued in the switch fabric memory 116 in step 422 for later reassembling and forwarding in steps 424 and 426.

Although this invention has been described in certain specific embodiments, those skilled in the art will have no difficulty devising variations which in no way depart from the scope and spirit of the present invention. It is therefore to be understood that this invention may be practiced otherwise than is specifically described. Thus, the present embodiments of the invention should be considered in all respects as illustrative and not restrictive, the scope of the invention to be indicated by the appended claims and their equivalents rather than the foregoing description.

What is claimed is:

1. A data switch comprising an input port, an output port and a memory coupled therebetween, characterized in that the data switch generates a discard processing indicator for a packet received on the input port, segments the packet into ones of units, and appends the discard processing indicator to the ones of units, further characterized in that the data switch compares the discard processing indicator appended to the ones of units with a discard criterion to determine whether to discard the ones of units, and further characterized in that the discard criterion is dynamically selected in accordance with a utilization level of an output que to which the ones of units are destined, and that the data switch appends a timestamp to the ones of units for determining a utilization level of the output queue at a time indicated by the timestamp.

2. The data switch of claim 1, wherein the discard processing indicator is a random number.

3. The data switch of claim 1 further characterized in that the data switch stores the ones of units in the memory if the units are determined not to be discarded.

4. The data switch of claim 1, wherein the ones of units are units of a fixed length.

5. A data switch comprising:
an input port generating a tag including a discard processing indicator for appending to ones of input units segmented from an input data packet;
an output port including one or more output queues, each output queue storing an output unit;
a switch fabric operative between the input port and the output port, the switch fabric including a congestion controller retrieving a level of utilization of an output queue to which a particular input unit is destined and selecting the input unit for discard or not based on the discard processing indicator in the tag appended to the input unit; and
wherein the utilization level of the output queue is selected based on a timestamp included in the tag.

6. The data switch of claim 5 wherein the switch fabric includes a memory storing non-discarded units for forwarding to the output port.

7. The data switch of claim 5, wherein the congestion controller compares the discard processing indicator with a discard criterion selected in accordance with the utilization level of the output queue.

8. The data switch of claim 5, wherein the discard processing indicator is a random number.

9. The data switch of claim 5, wherein the output port transmits to the switch fabric congestion status updates including queue utilization levels for the one or more output queues.

10. A method for congestion control in a data switch including an input port, an output port, and a memory coupled therebetween, the method comprising:
generating a number for a packet received on the input port;
segmenting the packet into ones of units;
appending the number to the ones of units;
individually comparing the number appended to the ones of units with a discard criterion for determining whether to discard the packet; and
appending the timestamp to the ones of units for determining a utilization level of the output queue at a time indicated by the timestamp.

11. The method of claim 10, wherein the number is a random number.

12. The method of claim 10, further comprising storing the ones of units in the memory if the units are determined not to be discarded.

13. The method of claim 10, further comprising selecting a discard criterion in accordance with a utilization level of an output queue to which the ones of units are destined.

14. A method for congestion control in a data switch, the method comprising:

generating a tag including a discard processing indicator;

appending the tag with the discard processing indicator to each unit segmented from an input data packet;

determining a level of utilization of an output queue to which a particular unit of the input data packet is destined by selecting a level of utilization for the output queue based on a timestamp included in the tag append to the particular unit;

determining a discard criterion in accordance with the determined level of utilization; and discarding the particular unit based on a conformance of the discard processing indicator in the tag appended to the particular unit with the discard criterion.

15. The method of claim 14, wherein the discard processing indicator is a random number.

16. The method of claim 14 further comprising transmitting to the switch fabric congestion status updates including a queue utilization level of the output queue.

17. A data switch comprising an input port, an output port and a memory coupled therebetween, characterized in that the data switch generates a uniform discard processing indicator for a packet received on the input port, segments the packet into ones of units, and appends the uniform discard processing indicator to the ones of units, further characterized in that the data switch compares for each of the ones of the units the uniform discard processing indicator appended thereto with a uniform discard criterion for ensuring that the ones of units receive a uniform discard decision.

18. A data switch comprising an input port, an output port and a memory coupled therebetween, characterized in that the data switch assigns a discard processing indicator for a packet received on the input port, segments the packet into ones of units and compares for each of the ones of the units the discard processing indicator with a discard criterion to determine whether to discard the each of the ones of the units, and further characterized in that the data switch appends a timestamp to the ones of units for determining a utilization level of the output queue at a time indicated by the timestamp.

19. The data switch of claim 18, wherein the discard processing indicator is appended to the ones of units.

20. The data switch of claim 18, wherein the discard processing indicator is a random number.

21. The data switch of claim 18 further characterized in that the data switch stores the ones of units in the memory if the units are determined not to be discarded.

22. The data switch of claim 18 further characterized in that the discard criterion is dynamically selected in accordance with a utilization level of an output queue to which the ones of units are destined.

23. The data switch of claim 18, wherein the ones of units are units of a fixed length.

24. A data switch comprising an input port, an output port and a memory coupled therebetween, characterized in that the data switch generates a discard processing indicator for a packet received on the input port, segments the packet into ones of units, and associates the discard processing indicator with the ones of units, further characterized in that the data switch compares the discard processing indicator associated with the ones of units with a discard criterion to determine whether to discard the ones of units, and further characterized in that the discard criterion is dynamically selected in accordance with a utilization level of an output queue to which the ones of units are destined and the data switch associates a timestamp with the ones of units for determining a utilization level of the output queue at a time indicated by the timestamp.

25. A method for congestion control in a data switch including an input port, an output port, and a memory coupled therebetween, the method comprising:

generating a number for a packet received on the input port;

segmenting the packet into ones of units;

associating the number with the ones of units;

individually comparing the number associated with the ones of units with a discard criterion for determining whether to discard the packet; and selecting a discard criterion in accordance with a utilization level of an output queue to which the ones of units are destined and associating a timestamp with the ones of units for determining a utilization level of the output queue at a time indicated by the timestamp.

26. A method for congestion control in a data switch, the method comprising:

generating a tag including a discard processing indicato;

associating the tag with the discard processing indicator with each unit segmented from an input data packet;

determining a level of utilization of an output queue to which a particular unit of the input data packet is destined by selecting a level of utilization for the output queue based on a timestamp included in the tag associated with the particular unit;

determining a discard criterion in accordance with the determined level of utilization; and discarding the particular unit based on a conformance of the discard processing indicator in the tag associated with the particular unit with the discard criterion.

* * * * *